(12) United States Patent
Ozawa (10) Patent No.: US 7,197,338 B2
(45) Date of Patent: Mar. 27, 2007

(54) DISPLAY DEVICE AND PORTABLE TERMINAL APPARATUS

(75) Inventor: Ryo Ozawa, Saitama (JP)

(73) Assignee: NEC Corporation, Tokyo (JP)

( * ) Notice: Subject to any disclaimer, the term of this patent is extended or adjusted under 35 U.S.C. 154(b) by 14 days.

(21) Appl. No.: 10/463,588

(22) Filed: Jun. 18, 2003

(65) Prior Publication Data
US 2003/0234897 A1 Dec. 25, 2003

(30) Foreign Application Priority Data
Jun. 20, 2002 (JP) .............................. 2002-180526

(51) Int. Cl.
*H04B 1/38* (2006.01)
(52) U.S. Cl. .................. 455/566; 455/575.1; 455/90.3; 349/61; 349/56
(58) Field of Classification Search ................ 466/566, 466/575.1, 550.1, 575.3, 575.4, 90.2, 90.3; 349/56, 61, 62, 68
See application file for complete search history.

(56) References Cited

U.S. PATENT DOCUMENTS

| | | | | |
|---|---|---|---|---|
| 5,450,619 | A * | 9/1995 | Maeda ........................ | 455/566 |
| 5,666,172 | A | 9/1997 | Ida et al. | |
| 6,011,602 | A | 1/2000 | Miyashita et al. | |
| 6,496,236 | B1 * | 12/2002 | Cole et al. ...................... | 349/61 |
| 6,611,097 | B1 * | 8/2003 | Hanahara et al. ............ | 313/506 |
| 6,667,731 | B2 * | 12/2003 | Park ............................ | 345/102 |
| 6,741,301 | B2 * | 5/2004 | Tsuji ........................... | 349/58 |
| 6,748,243 | B1 * | 6/2004 | Kubo et al. ............... | 455/569.1 |
| 6,757,036 | B1 * | 6/2004 | Dolezal et al. ............. | 349/113 |
| 2001/0011029 | A1 * | 8/2001 | Iwabuchi et al. ........... | 455/566 |
| 2001/0041543 | A1 * | 11/2001 | Lim ............................ | 455/90 |
| 2001/0049293 | A1 * | 12/2001 | Shimazaki .................. | 455/550 |
| 2002/0039914 | A1 | 4/2002 | Hama et al. | |
| 2002/0058527 | A1 * | 5/2002 | Kawasaki et al. .......... | 455/550 |

FOREIGN PATENT DOCUMENTS

| | | |
|---|---|---|
| CN | 1333621 | 1/2002 |
| CN | 1346225 | 4/2002 |
| EP | 0 631 416 | 12/1994 |
| EP | 0 802 446 | 10/1997 |
| EP | 0 881 617 | 12/1998 |
| EP | 1 231 757 A2 | 8/2002 |
| GB | 2343324 * | 5/2000 |
| JP | 4-329516 | 11/1992 |
| JP | 6-86320 | 3/1994 |
| JP | 09243988 | 9/1997 |
| JP | 10-215085 | 8/1998 |
| JP | 11095215 | 4/1999 |
| JP | 2001-24762 | 1/2001 |
| JP | 2001-264732 | 9/2001 |
| JP | 2002-57776 | 2/2002 |
| JP | 2002-133927 | 5/2002 |
| JP | 2002-189230 | 7/2002 |

* cited by examiner

*Primary Examiner*—Edward F. Urban
*Assistant Examiner*—Blane Jackson
(74) *Attorney, Agent, or Firm*—Young & Thompson (57) ABSTRACT

A display device includes a main LCD, a sub LCD, and a backlight. The main LCD displays information. The sub LCD is arranged to make its rear surface oppose that of the main LCD to display information different from that of the main LCD. The backlight illuminates the main LCD and sub LCD. A portable terminal apparatus is also disclosed.

10 Claims, 12 Drawing Sheets

DISPLAY DEVICE AND PORTABLE TERMINAL APPARATUS

BACKGROUND OF THE INVENTION

The present invention relates to a portable terminal apparatus such as a cellular phone which has display sections for displaying various kinds of information on one surface and its rear surface, and a display device used in the portable terminal apparatus.

Conventionally, some portable terminal apparatuses, which are designed to be able to changeably and selectively take a form with a covered main display section or a form with an uncovered (exposed) main display section, have a sub display section on its rear surface in addition to the main display section.

An example of a portable terminal apparatus having a plurality of display sections is a cellular phone constituted by, e.g., foldably or stretchably connecting two housings. An apparatus of this type can present information such as time or an incoming call notification to the user through the sub display section even when the main display section is kept covered. An apparatus of this type is very preferable for a user in terms of operability and convenience, and various models that are commercially available are very popular.

Figure 14:
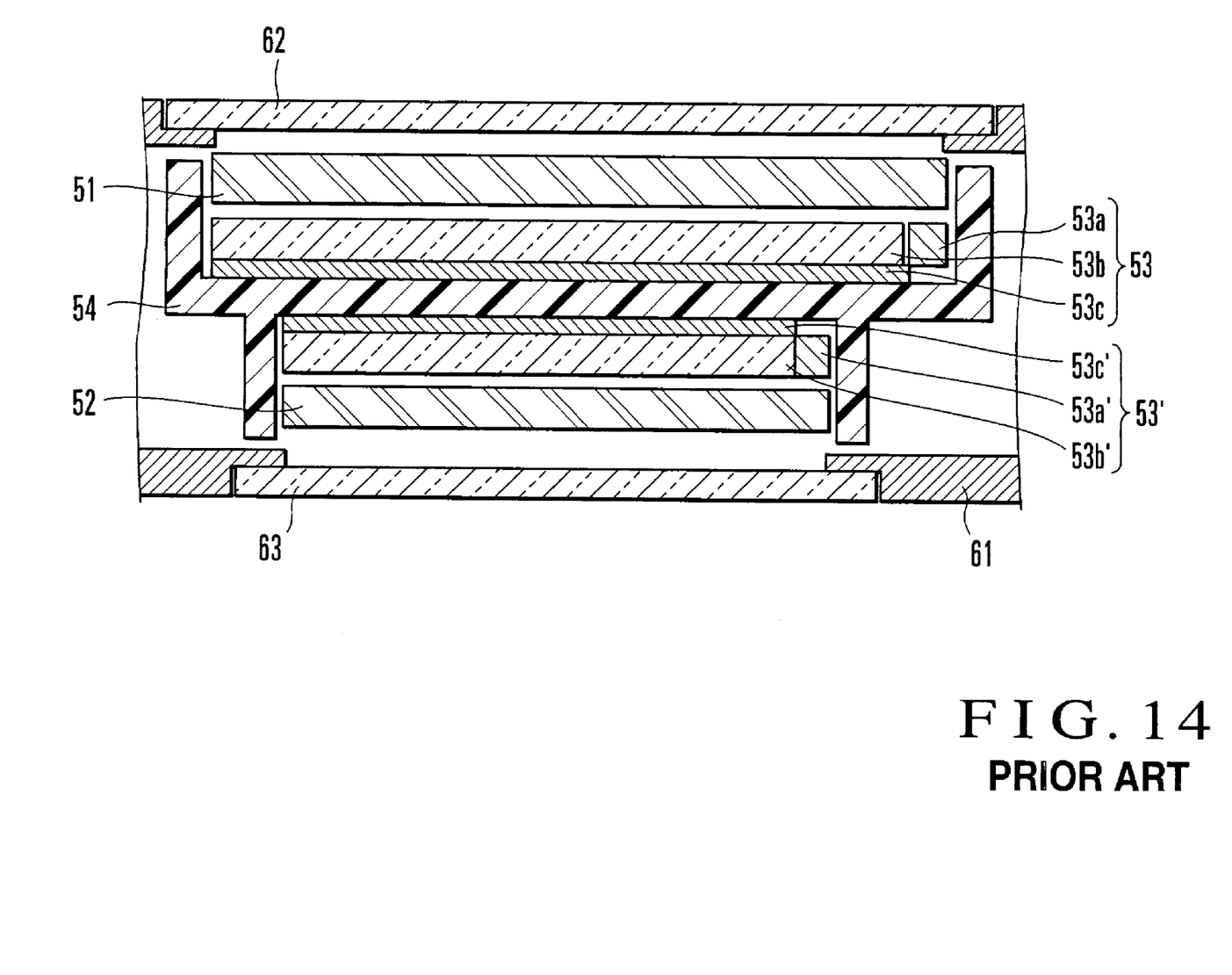
FIG. 14 is an enlarged longitudinal sectional view showing the schematic structure near a display device in a conventional portable terminal apparatus.

As shown in FIG. 14, in a display device in a portable terminal apparatus, a main LCD (Liquid Crystal Display) 51 and a backlight 53 that trans-illuminates the main LCD 51, and a sub LCD 52 and a backlight 53' that trans-illuminates the sub LCD 52 are bonded to both surfaces of a frame 54, respectively, by a bonding means such as a double-faced tape (not shown). Additionally, as for the display device in this portable terminal apparatus, the main LCD 51 and sub LCD 52 are arranged in a housing 61 of the portable terminal apparatus such that they can be seen from the user through a main screen 62 and sub screen 63, respectively.

With this arrangement, the main display section having the main LCD 51 and main screen 62, and the sub display section having the sub LCD 52 and sub screen 63 display various kinds of information for the user by trans-illumination from the corresponding backlights.

In the above-described conventional portable terminal apparatus, however, the backlights 53 and 53' are arranged in the main display section and sub display section, respectively, to illuminate the display sections. For this reason, two backlights are arranged in the display device.

More specifically, the backlights 53 and 53' have LEDs (Light Emitting Diodes) 53a and 53a', light guide plates 53b and 53b', and reflecting sheets 53c and 53c', respectively. Since two sets of components are necessary, the thickness and weight of them increase the total thickness and weight, and the cost also increases.

For example, to illuminate both the main display section and the sub display section to cause the user to make use of them, the backlights 53 and 53' must be simultaneously turned on. For this reason, power is consumed by the two backlights.

Generally, a portable terminal apparatus operates by an internal power supply. For this reason, when the power consumption increases, the continuous operation time shortens.

SUMMARY OF THE INVENTION

It is an object of the present invention to provide a display device and portable terminal apparatus in which a plurality of display sections are illuminated by one backlight (illumination means) whereby increases in thickness, weight, and cost due to use of two backlights can be prevented.

It is another object of the present invention to provide a display device and portable terminal apparatus, whose power consumption is smaller than that by two backlights even when both the main display section and the sub display section are simultaneously illuminated.

In order to achieve the above objects, according to the present invention, there is provided a display device comprising first display means for displaying information, second display means, arranged to make a rear surface oppose that of the first display means, for displaying information different from that of the first display means, and one illumination means for illuminating the first display means and second display means.

DESCRIPTION OF THE PREFERRED EMBODIMENTS

Figure 1:
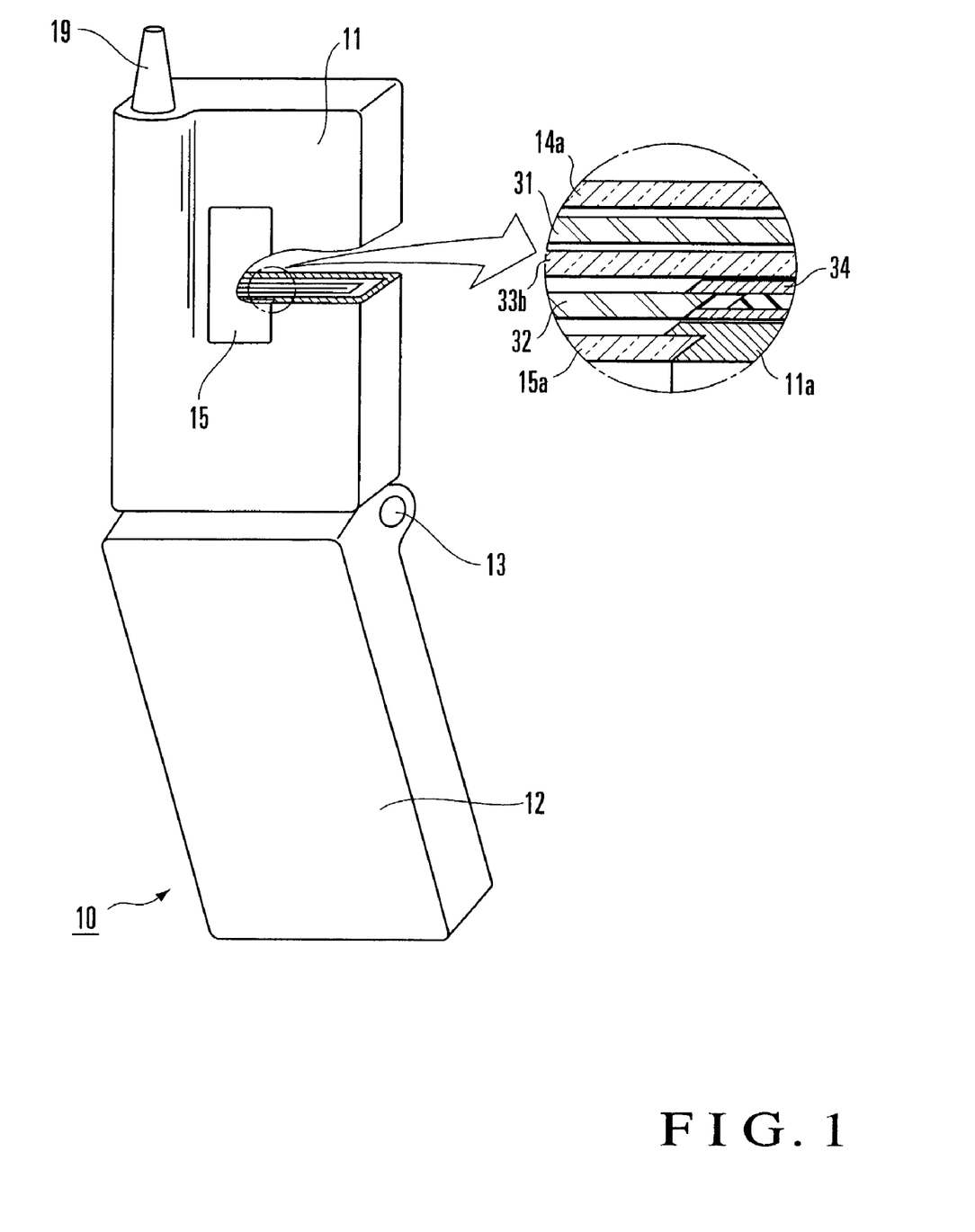
FIG. 1 shows a partially cutaway perspective view of the rear side of a cellular phone which is in an open state and has a first housing structure according to an embodiment of the present invention and an enlarged cross-sectional view of the cutaway portion.
Figure 2A:
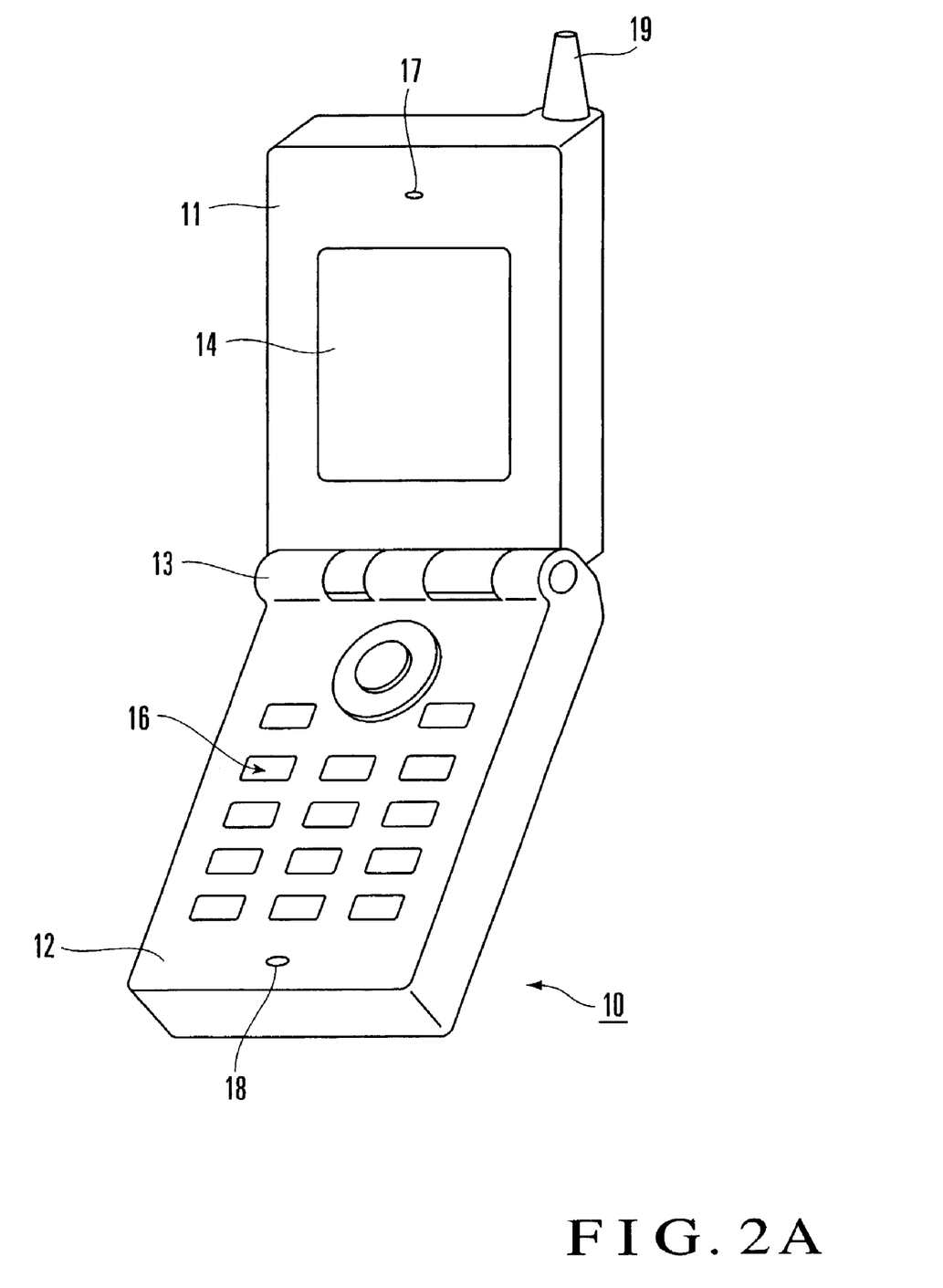
FIG. 2A is a perspective view showing the front side of the cellular phone in the open state.
Figure 2B:
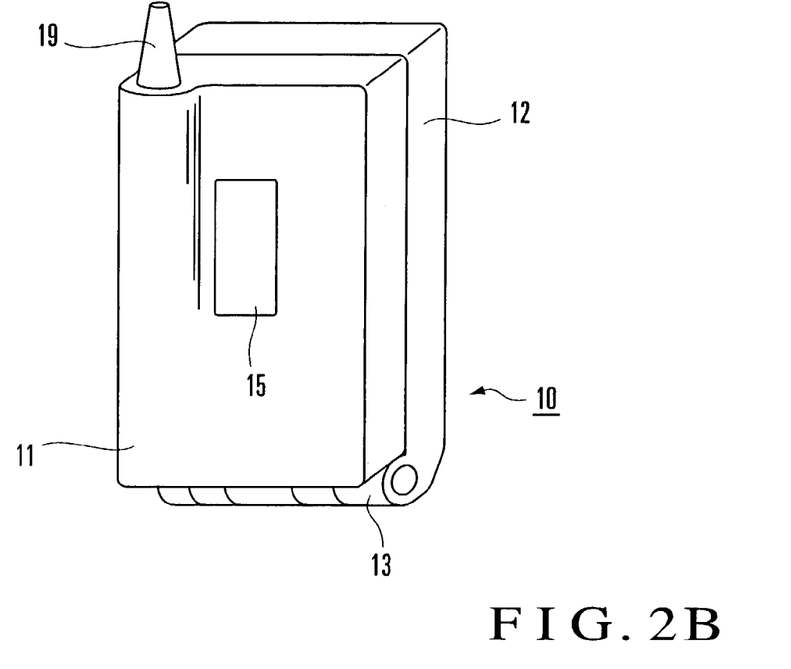
FIG. 2B is a perspective view showing the rear side of the cellular phone in a closed state.
Figure 3:
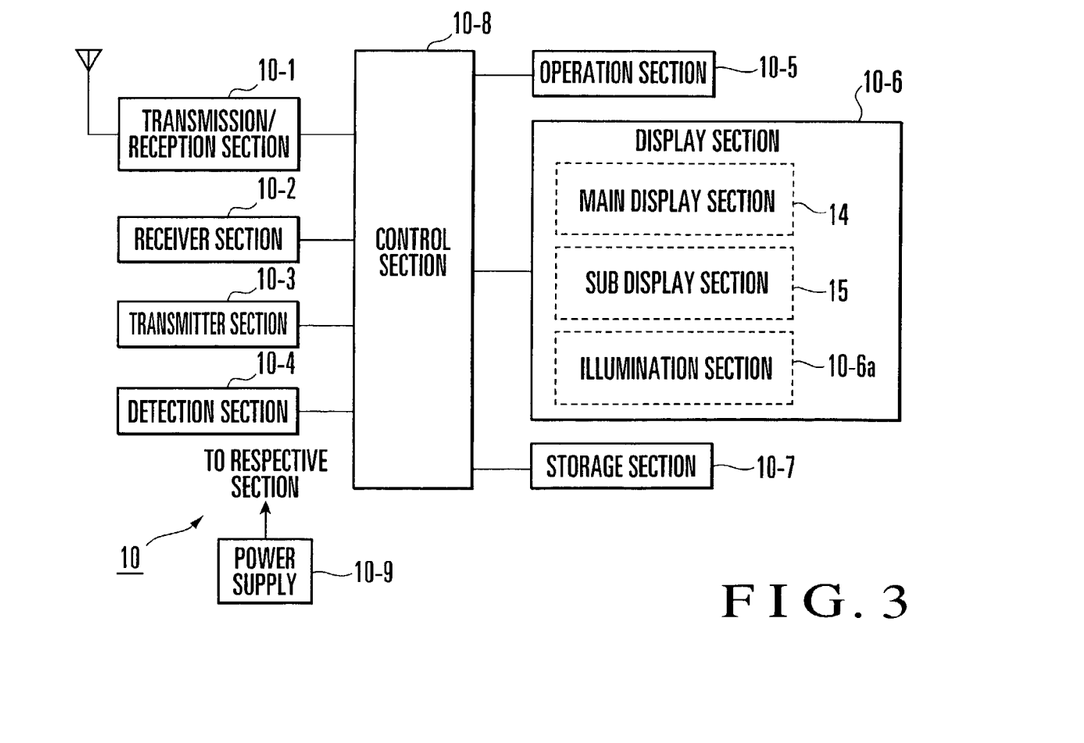
FIG. 3 is a functional block diagram showing the schematic arrangement of the cellular phone.

An embodiment in which a portable terminal apparatus according to the present invention is applied to a cellular phone will be described next on the basis of the accompanying drawings. FIGS. 1 to 3 show a cellular phone according to an embodiment using a first housing structure using a hinge portion. FIGS. 4 to 7 show a cellular phone according to another embodiment using a slide-type second housing structure. FIGS. 8 to 13B explain a display device which can be commonly applied to the first and second housing structures and control thereof.

The embodiment using the first housing structure using a hinge portion will be described first.

A cellular phone 10 according to the first housing structure as the first embodiment of the present invention is constituted by connecting a display-side terminal main body 11 to an operation-side terminal main body 12 through a hinge portion 13. The display-side terminal main body 11 has a main body display section 14 which displays various kinds of information such as an input telephone number or mail text. The operation-side terminal main body 12 has operation buttons 16 with which the user performs input. The hinge portion 13 is integrated with each of the display-side terminal main body 11 and operation-side terminal main body 12 such that the main bodies can be closed to make the main display section 14 oppose the operation buttons 16, as shown in FIGS. 1 to 3.

In the above arrangement, the display-side terminal main body 11 and operation-side terminal main body 12 are opened/closed through the hinge portion 13. With this structure, the cellular phone can take a form (open state) shown in FIGS. 1 and 2A in which the main display section 14 is exposed or a form (closed state) shown in FIG. 2B in which the main display section 14 is covered.

More specifically, when the two terminal main bodies are opened through the hinge portion 13, the main display section 14 and operation buttons 16 are exposed (open state). When the two terminal main bodies are closed (folded) through the hinge portion 13, the main display section 14 is covered with the operation-side terminal main body 12 (closed state).

The display-side terminal main body 11 has a sub display section 15 which displays various kinds of information such as time or an incoming call notification on the rear surface of the main display section 14, as shown in FIGS. 1 and 2B. The display contents of the main display section 14 are different from those of the sub display section 15. The sub display section 15 is arranged on the rear surface of the main display section 14, as described above. Hence, the sub display section 15 is exposed independently of whether the two terminal main bodies are in the open or closed state.

Information to be displayed by the main display section 14 or sub display section 15 can be selected by the user from a menu prepared in advance. The utilization method of each display section can be switched in accordance with the purpose or taste of the user.

The main display section 14 has a main LCD (Liquid Crystal Display) 31 with which information is displayed. The sub display section 15 has a sub LCD 32 with which information is displayed.

The main LCD 31 and sub LCD 32 are transmitting liquid crystal panels which are illuminated by trans-illumination from one illumination means called a backlight 33. The display surface of the sub display section 15 is smaller than that of the main display section 14 in both vertical and horizontal directions. The sub display section 15 is arranged immediately on the rear side of the main display section 14. With this arrangement, the backlight 33 illuminates the respective display sections.

The display device will be described later in detail with reference to FIGS. 8 to 13B.

The display-side terminal main body 11 has an antenna 19 extendable in the longitudinal direction of the display-side terminal main body 11 on the rear surface of the main display section 14. The display-side terminal main body 11 has a receiver 17 serving as a receiver section. The operation-side terminal main body 12 has a microphone 18 serving as a transmitter section. With this structure, the user transmits/receives voice in the telephone function.

Functions such as the speech communication function and mail function of this cellular phone are implemented by required electronic circuits on circuit boards such as display device FPCs (Flexible Printed Circuit boards) 3A which are incorporated in the display-side terminal main body 11 and operation-side terminal main body 12. The cellular phone operates by a detachable internal power supply. The above-described speech communication function and mail function are well-known.

The display-side terminal main body 11 and operation-side terminal main body 12 have a detection means for detecting whether the two terminal main bodies are closed through the hinge portion 13. As the detection means, for example, a magnet is arranged on one of the terminal main bodies, and a magnetic sensing switch is arranged on the other terminal main body. The magnetic sensing switch can sense the magnetism of the magnet in the closed state. The positions of the magnet and magnetic sensing switch are not particularly limited as far as the magnetic sensing switch senses the magnetism of the magnet in the closed state wherein the two terminal main bodies are closed through the hinge portion 13 and does not sense the magnetism of the magnet in the open state wherein the two terminal main bodies are open through the hinge portion 13.

The magnet and magnetic sensing switch are arranged in the above way. When the two terminal main bodies are opened/closed through the hinge portion 13, and accordingly, the distance between the magnet and the magnetic sensing switch changes, the magnetic sensing switch is turned on/off depending on whether the distance is the sensing distance between the magnetic sensing switch and the magnet.

A signal sent upon turning on/off the switch is used to control the display device (to be described later) as an open/close detection signal (a detection signal that detects whether the main display section 14 is covered) by a control means comprising the above-described electronic circuits in the terminal main bodies.

The portable terminal apparatus 10 according to the first embodiment will be described with reference to FIG. 3. The portable terminal apparatus 10 according to the first embodiment comprises an antenna, a radio section 10-1 connected to the antenna, and a control section 10-8 connected to the radio section 10-1.

The portable terminal apparatus 10 according to the first embodiment also comprises a receiver section 10-2, transmitter section 10-3, detection section 10-4, operation section 10-5, and storage section 10-7 which are connected to the control section 10-8. The portable terminal apparatus also has a power supply 10-9, e.g., a detachable power supply.

A display section 10-6 comprises the main display section 14, the sub display section 15, and an illumination section 10-6a.

The radio section 10-1 transmits/receives a signal to/from another terminal apparatus. The receiver section 10-2, transmitter section 10-3, detection section 10-4, and display section 10-6 have the above-described functions. The storage section 10-7 stores programs that implement the functions of the portable terminal apparatus. For example, the storage section 10-7 stores information to be displayed on the main display section 14 and sub display section 15 in advance. The control section 10-8 causes the above-described sections to function.

A cellular phone using a slide-type second housing structure according to the second embodiment of the present invention will be described next.

A cellular phone 20 using the second housing structure according to the second embedment is constituted by slidably connecting a display-side terminal main body 21 to an operation-side terminal main body 22 through slide portions 23a and slide rails (slidable support portions) 23b, as shown in FIGS. 4 to 7. The display-side terminal main body 21 has a main display section 24 which displays various kinds of information such as an input telephone number or mail text. The operation-side terminal main body 22 has operation buttons 26 with which the user performs input. The slide portions 23a are integrally formed on the left and right sides of the display-side terminal main body 21. The slide rails (slidable support portions) 23b are formed on the left and right side surfaces of the operation-side terminal main body 22.

More specifically, the slide portions 23a formed on the display-side terminal main body 21 and the slide rails 23b formed on the operation-side terminal main body 22 to slidably support the slide portions 23a are connected such that the operation-side terminal main body 12 and operation-side terminal main body 22 can stretch upon sliding.

In the above arrangement, the display-side terminal main body 21 and operation-side terminal main body 22 are connected to slide in the longitudinal direction of the terminal main bodies. With this structure, the cellular phone can take a form (closed state) in which the main display section 24 is covered with the operation-side terminal main body 22 or a form (stretched state) in which the main display section 24 is exposed.

More specifically, when the two terminal main bodies are slid by the slide portions 23a and slide rails 23b and closed, the operation-side terminal main body 22 covers the main display section 24 (closed state). When the two terminal main bodies are slid by the slide portions 23a and slide rails 23b and stretched (expanded), the main display section 24 is exposed (stretched state).

Figure 4:
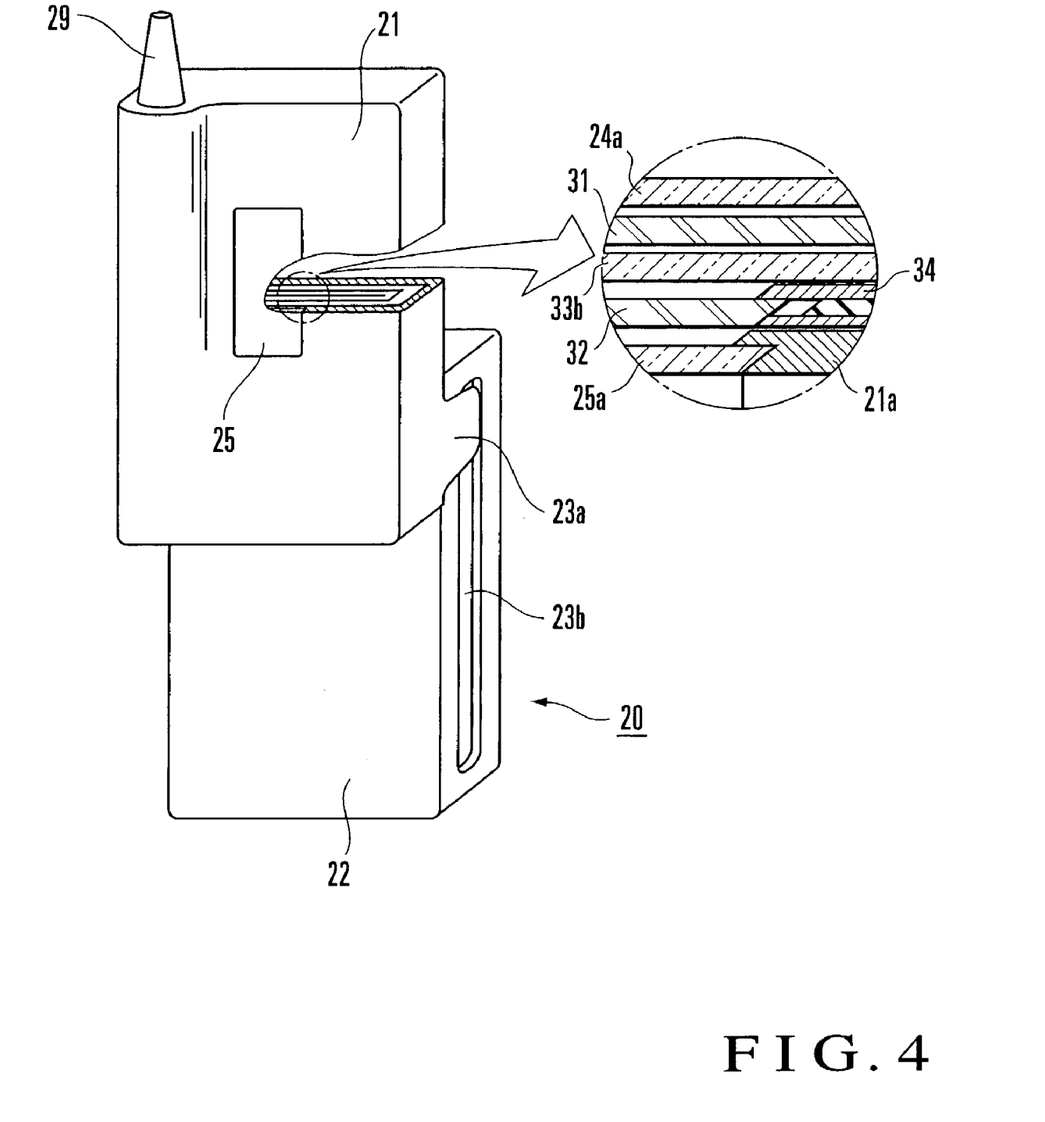
FIG. 4 shows a partially cutaway perspective view of the rear side of a cellular phone which is in a stretched state and has a second housing structure according to another embodiment of the present invention and an enlarged cross-sectional view of the cutaway portion.
Figure 6:
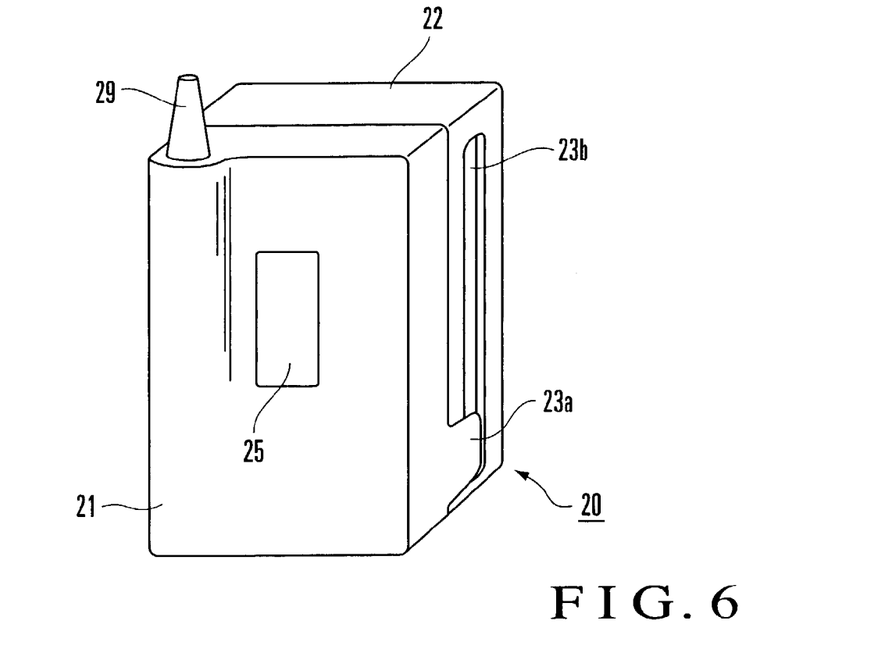
FIG. 6 is a perspective view showing the rear side of the cellular phone in the closed state.

The display-side terminal main body 21 has a sub display section 25 which displays various kinds of information such as time or an incoming call notification on the rear surface of the main display section 24, as shown in FIGS. 4 and 6. The sub display section 25 is arranged on the rear surface of the main display section 24, as described above. Hence, the sub display section 25 is exposed independently of whether the two terminal main bodies are in the stretched or closed state.

Information to be displayed by the main display section 24 or sub display section 25 can be selected by the user from a menu prepared in advance, as in the embodiment using the first housing structure. The utilization method of each display section can be switched in accordance with the purpose or taste of the user.

The operation buttons 26 are arranged on the operation-side terminal main body 22 on the rear surface of the surface that opposes the main display section 24 in the closed state.

Figure 5:
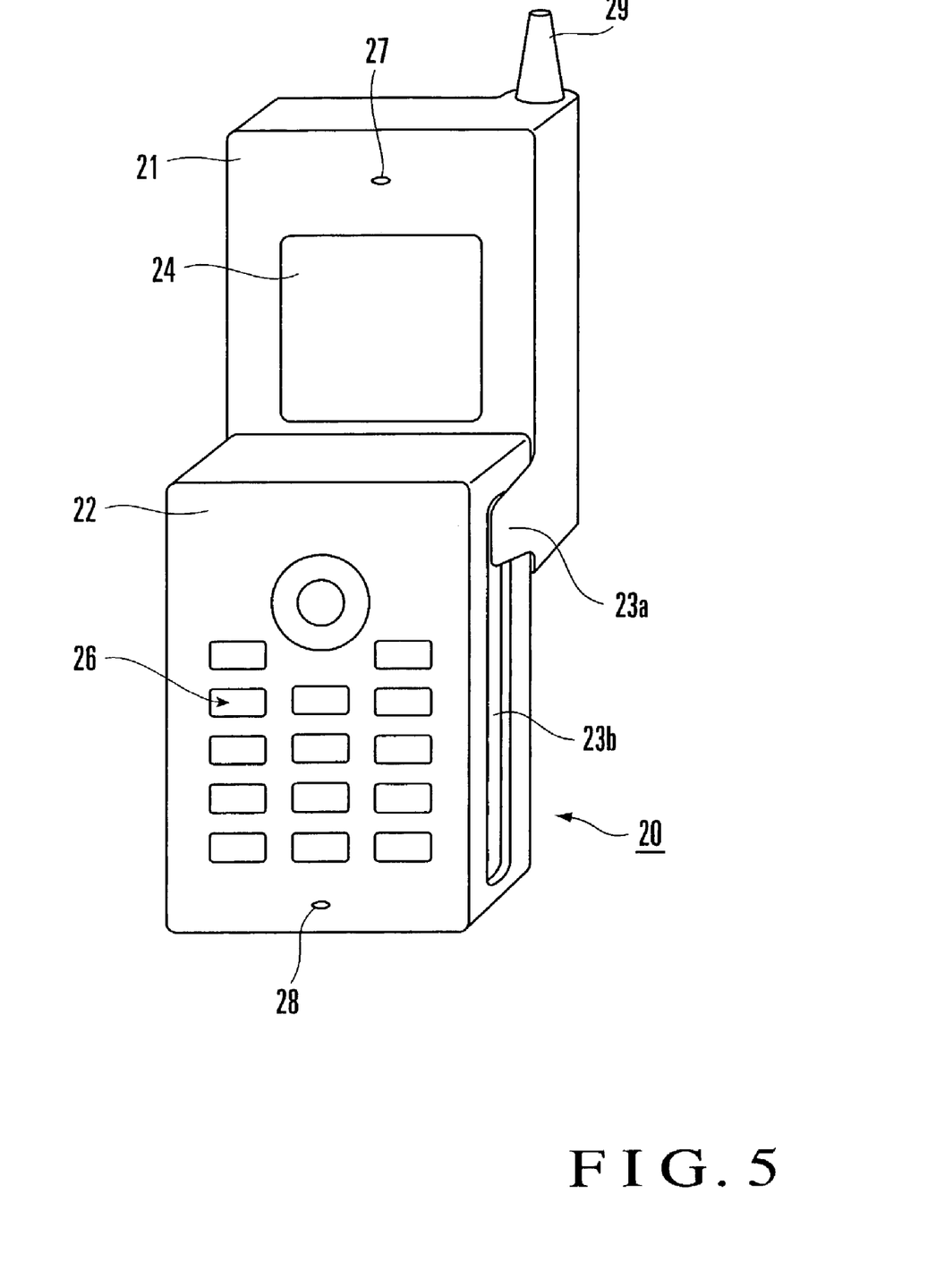
FIG. 5 is a perspective view showing the front side of the cellular phone in the stretched state.
Figure 7:
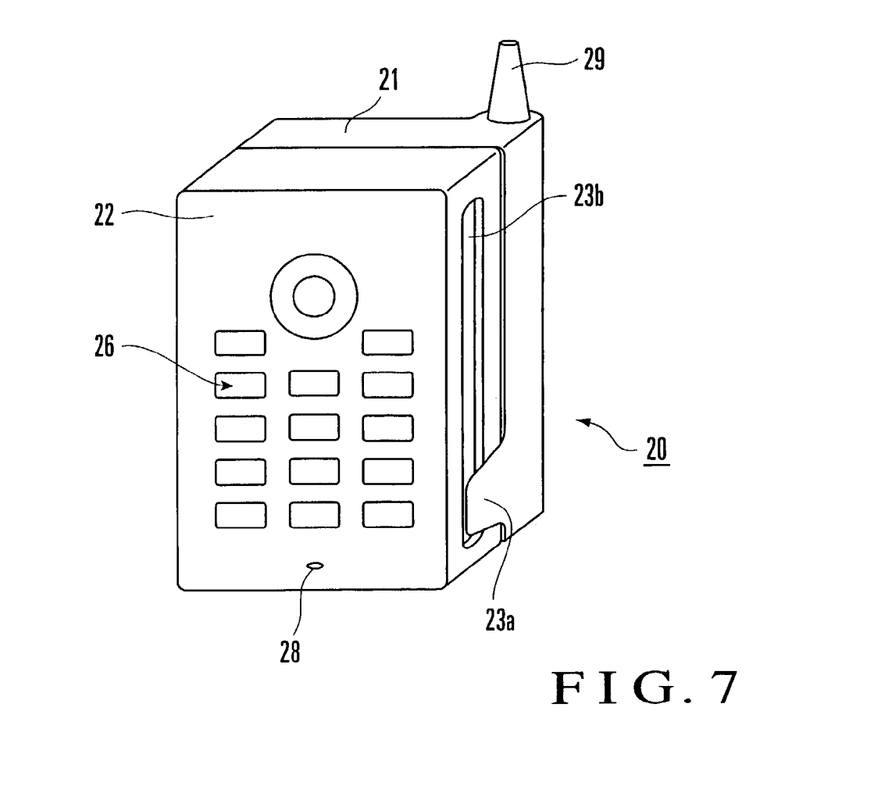
FIG. 7 is a perspective view showing the front side of the cellular phone in the closed state.

Accordingly, the operation buttons 26 are exposed independently of whether the two terminal main bodies are stretched or closed, as shown in FIGS. 5 and 7.

The main display section 224 has a main LCD 31 with which information is displayed. The sub display section 25 has a sub LCD 32 with which information is displayed.

The main LCD 31 and sub LCD 32 are transmitting liquid crystal panels which are illuminated by trans-illumination from one illumination means called a backlight 33. The display surface of the sub display section 25 is smaller than that of the main display section 24 in both vertical and horizontal directions. The sub display section 25 is arranged immediately on the rear side of the main display section 24. With this arrangement, the backlight 33 illuminates the respective display sections.

The display device will be described later in detail with reference to FIGS. 8 to 13B.

The display-side terminal main body 21 has an antenna 29 extendable in the longitudinal direction of the display-side terminal main body 21 on the rear surface of the main display section 24. The display-side terminal main body 21 has a receiver 27 serving as a receiver section. The operation-side terminal main body 22 has a microphone 28 serving as a transmitter section. With this structure, the user transmits/receives voice in the telephone function.

Functions such as the speech communication function and mail function of this cellular phone are implemented by required electronic circuits on circuit boards such as display device FPCs (Flexible Printed Circuit boards) 3A which are incorporated in the display-side terminal main body 21 and operation-side terminal main body 22, as in the embodiment using the first housing structure. The cellular phone operates by a detachable internal power supply. The above-described speech communication function and mail function are well-known.

The display-side terminal main body 21 and operation-side terminal main body 22 have, as a detection section which detects whether the two terminal main bodies are closed by the slide portions 23a and slide rails 23b, a magnet arranged on one of the terminal main bodies and a magnetic sensing switch arranged on the other terminal main body. The magnetic sensing switch can sense the magnetism of the magnet in the closed state. The positions of the magnet and magnetic sensing switch are not particularly limited as far as the magnetic sensing switch senses the magnetism of the magnet in the closed state wherein the two terminal main bodies are closed, and the main display section 24 is covered, and does not sense the magnetism of the magnet in the stretched state wherein the two terminal main bodies are stretched, and the main display section 24 is exposed.

The magnet and magnetic sensing switch are arranged in the above way. When the two terminal main bodies are slid by the slide portions 23a and slide rails 23b, and accordingly, the distance between the magnet and the magnetic sensing switch changes, the magnetic sensing switch is turned on/off depending on whether the distance is the sensing distance between the magnetic sensing switch and the magnet.

A signal sent upon turning on/off the switch is used to control the display device (to be described later) as an open/close detection signal (a detection signal that detects whether the main display section 24 is covered) by a control means comprising the above-described electronic circuits in the terminal main bodies.

Figure 8:
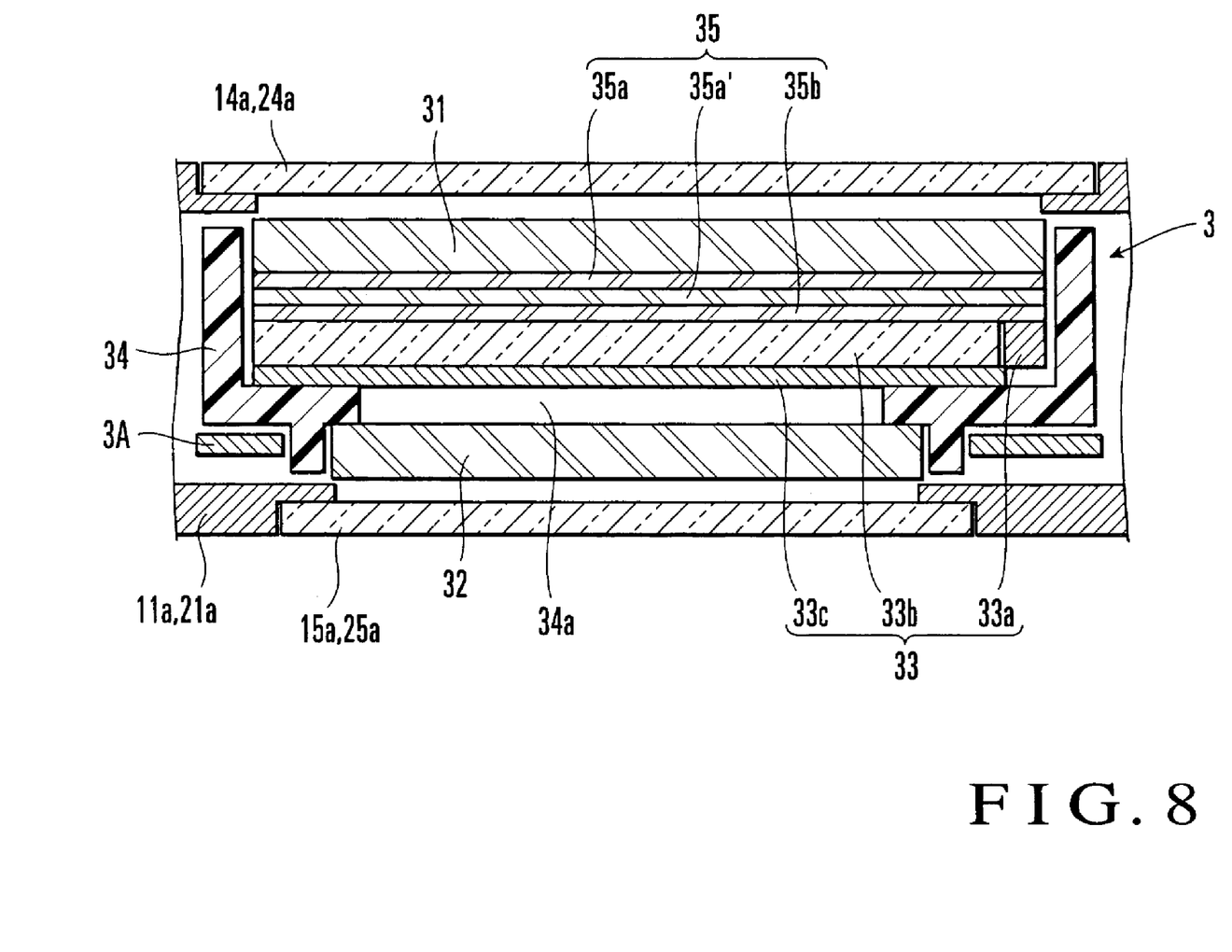
FIG. 8 is an enlarged longitudinal sectional view showing the schematic structure near a display device 3 in a display-side terminal main body 11 or 21.

A display device 3 commonly used in the first and second embodiments using the above-described first and second housing structures and its peripheral structure will be described next. FIG. 8 shows the schematic structure near the display device 3 in the display-side terminal main body 11 or 21. Wiring FPCs from LCDs are not illustrated in FIG. 8.

As shown in FIG. 8, in the display device 3, the backlight 33, an adjustment section 35, and the main LCD 31 are bonded sequentially in this order to a surface opposing a main screen 14a or 24a and arranged on a flat surface portion parallel to the main screen 14a or 24a. Additionally, in the display device, the sub LCD 32 is bonded to a surface opposing a sub screen 15a or 25a.

For the display device 3 having the above structure, the main LCD 31 is made of a transparent member and accommodated in a display-side terminal housing 11a or 21a such that the user can see the entire display surface from the outside through the main screen 14a or 24a that protects the main LCD 31. The sub LCD 32 is also made of a transparent member and accommodated in the display-side terminal housing 11a or 21a such that the user can see the entire display surface from the outside through the sub screen 15a or 25a that protects the sub LCD 32.

Each of the main screen 14a or 24a and sub screen 15a or 25a has a coating such as an anti-reflection film on its surface. Accordingly, the user can suitably see the internal LCDs.

The device of the display device 3 will be described in detail with reference to FIGS. 8 to 10B.

The frame 34 that supports the above-described LCDs and backlight has a through hole 34a at the above-described flat surface portion that supports the LCDs and backlight, as shown in FIG. 8. The through hole 34a has a size that allows the backlight 33 bonded to the main LCD 31 side of the flat surface portion to illuminate the entire display surface of the sub LCD 32 bonded to the rear side of the backlight 33. In other words, the size of the through hole 34a equals a value obtained by subtracting the area of the adhesive means such as a double-face tape that bonds the sub LCD 32 to the frame 34 from the size of the sub LCD 32.

When the through hole 34a is formed, the main LCD 31 made of a transparent liquid crystal panel and the sub LCD 32 made of a transparent liquid crystal panel which has a display surface smaller than that of the main LCD 31 and is arranged immediately on the rear side of the main LCD 31 are trans-illuminated by the single backlight 33 serving as an illumination section.

Figure 9A:
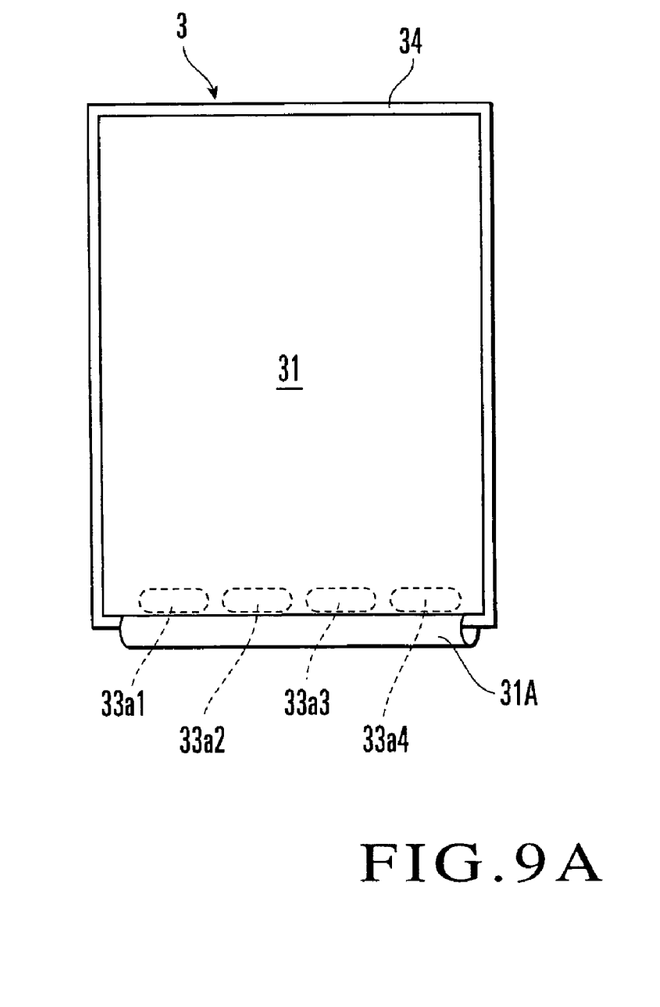
FIG. 9A is a front view showing the schematic structure of the display device 3.

As shown in FIGS. 8 and 9A, the backlight 33 bonded to the flat surface portion of the frame 34 comprises an LED section 33a including four LEDs (Light Emitting Diodes) (illumination sections) 33a1 to 33a4, a light guide plate 33b which guides light from the LEDs to the entire display surfaces of the main LCD 31 and sub LCD 32, and a reflecting sheet 33c which semi-transparently reflects light.

More specifically, the reflecting sheet 33c is bonded first to the flat surface portion of the frame 34. The light guide plate 33b is bonded to the reflecting sheet 33c. The LED section 33a is arranged at the outer edge of a short-side portion of the flat surface portion of the frame 34.

The sub LCD 32 allows the user to suitably see display information even with a light amount smaller than the main LCD 31 (dark illumination). Accordingly, even when the reflecting sheet 33c reflects light to the entire display surface of the main LCD 31, the amount of light that passes through the through hole 34a due to the semi-transparent reflecting sheet 33c sufficiently allows the user to suitably see display information on the sub LCD 32.

The adjustment section 35 is arranged between the backlight 33 and the main LCD 31 to do adjustment such that the light from the backlight 33 can suitably be used for trans-illumination of the main LCD 31. The adjustment section 35 comprises luminance increasing films 35a and 35a' which increase the luminance and a diffusion sheet 35b that diffuses light. The adjustment section 35 can employ a suitable arrangement in accordance with the type of backlight 33 or main LCD 31 such that a desired optical characteristic can be obtained.

Figure 9B:
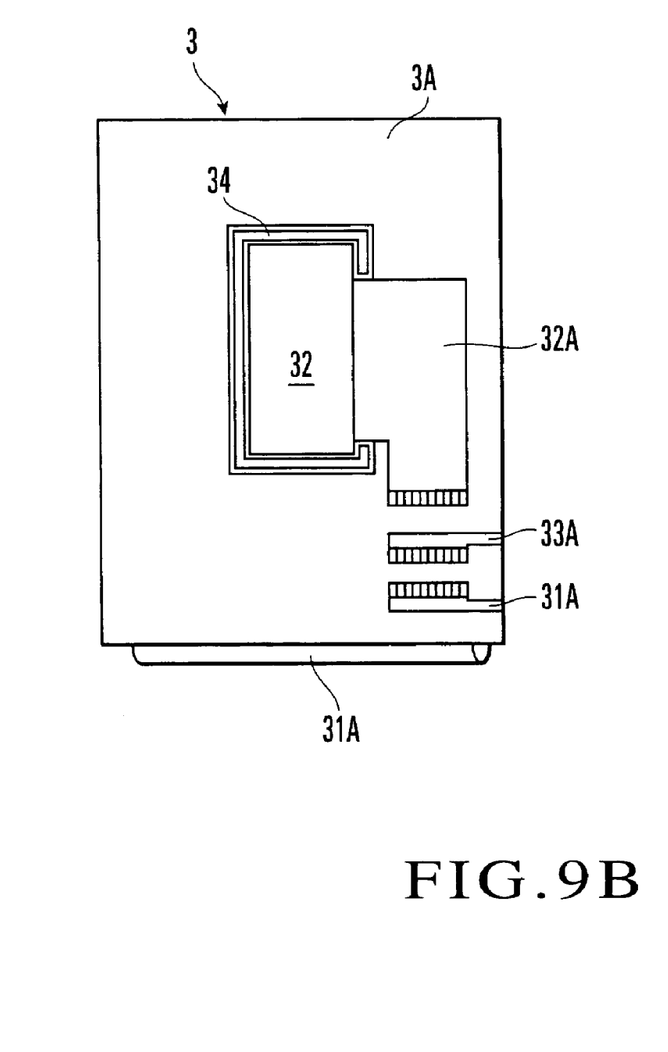
FIG. 9B is a rear view showing the schematic structure of the display device 3.

On the surface of the frame 34 where the sub LCD 32 is arranged, the display device FPC (Flexible Printed Circuit board) 3A is arranged outside the sub LCD 32 and the protective wall portion of the frame 34 arranged around the sub LCD 32. The FPC 3A has a function as a control section that implements the functions of the display device 3. The space in the direction of display surface, in which the display device FPC 3A is arranged, is generated because the sub LCD 32 is smaller than the main LCD 31 both vertically and horizontally in the direction of display surface.

The display device FPC 3A has the above-described required electronic circuit in the operation-side terminal main body 12 or 22. A wiring FPC is connected from each of the main LCD 31, sub LCD 32, and backlight 33.

A main LCD FPC 31A is temporarily bent from the main LCD 31 to the side surface of the frame 34, as shown in FIG. 9A. When the connection portion is bent from the side surface of the frame 34 and connected to the display device FPC 3A, as shown in FIG. 9B.

A sub LCD FPC 32A extends from an opening in the above-described protective wall portion of the frame 34 which corresponds to the other surface of the sub LCD 32 to the direction of display surface and is then connected to the display device FPC 3A, as shown in FIG. 9B.

Figure 10A:
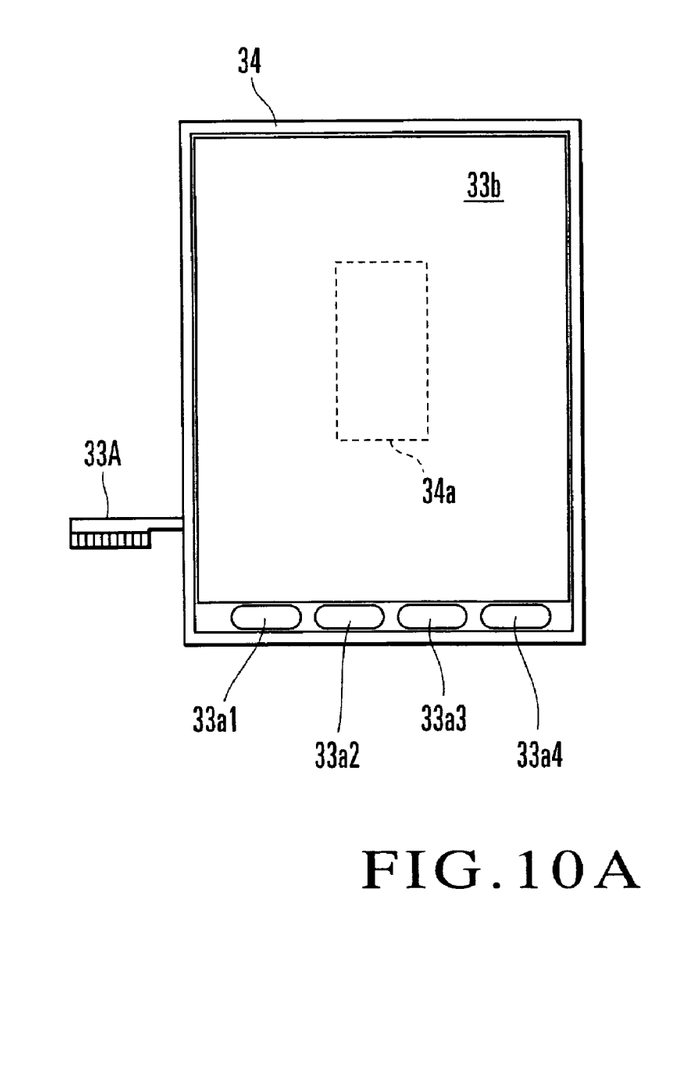
FIG. 10A is a front view showing the schematic arrangement of a backlight 33 and frame 34.
Figure 10B:
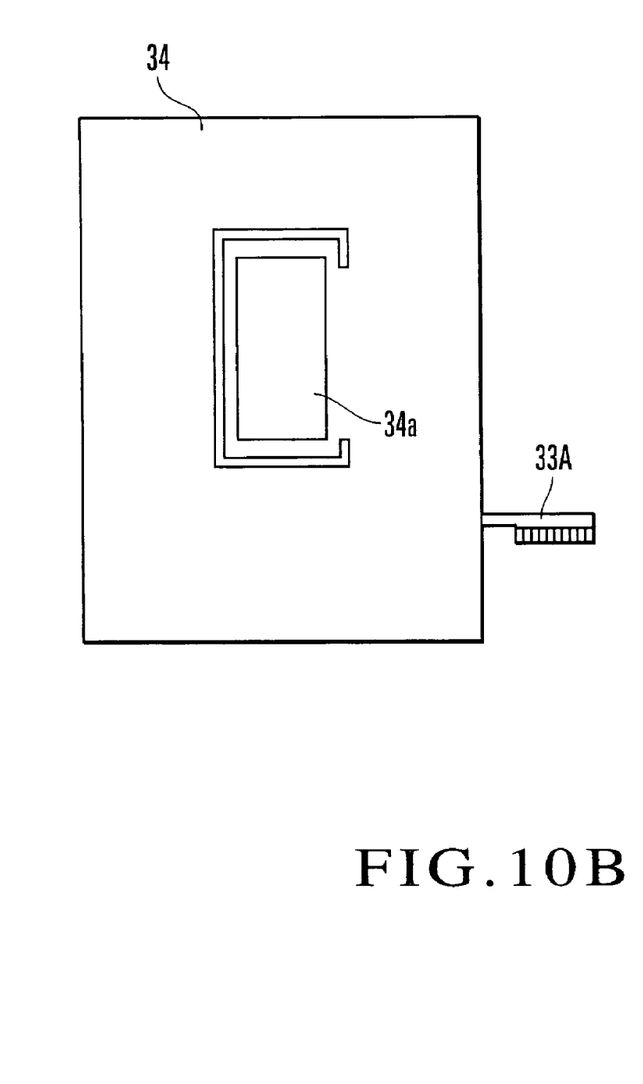
FIG. 10B is a rear view showing the schematic arrangement of the backlight 33 and frame 34.

A backlight FPC 33A projects from the frame 34 to the direction of side surface, as shown in FIG. 10B, and then bent from the direction of side surface and connected to the display device FPC 3A, as shown in FIG. 9B.

Power supply control to make the LED section 33a emit light will be described next.

Figure 11:
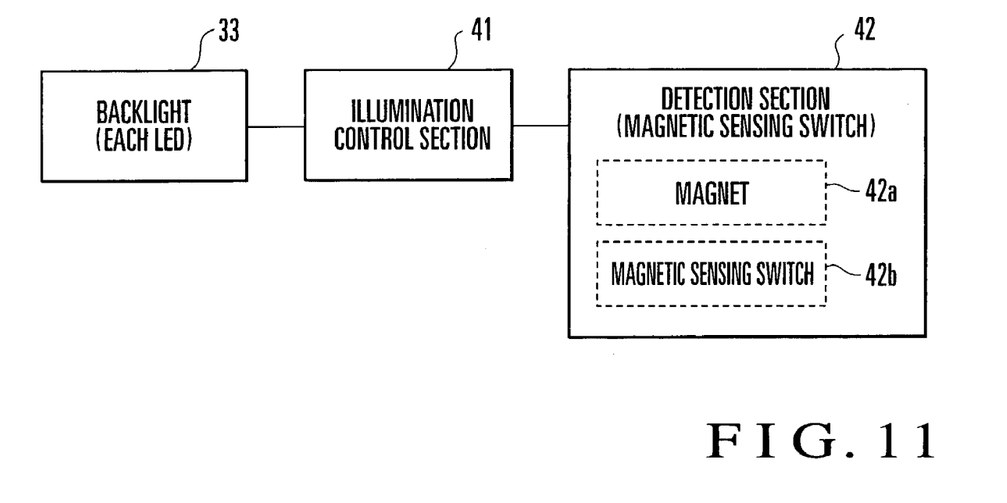
FIG. 11 is a block diagram showing the schematic arrangement of a circuit related to control of the cellular phone according to the embodiment of the present invention.

As shown in FIG. 11, a control section 41 controls power supply to the LEDs 33a1 to 33a4 in the backlight 33 by using an open/close detection signal output when the magnetic sensing switch of a detection section 42 is turned on/off.

The circuit arrangement of each of the LEDs 33a1 to 33a4 is formed by a pattern formed on an FPC or the like and an LED. A first circuit arrangement shown in FIG. 12A, which uses a serial scheme, and a second circuit arrangement shown in FIG. 12B, which can switch the input and output terminals, will be described below.

Figure 12A:
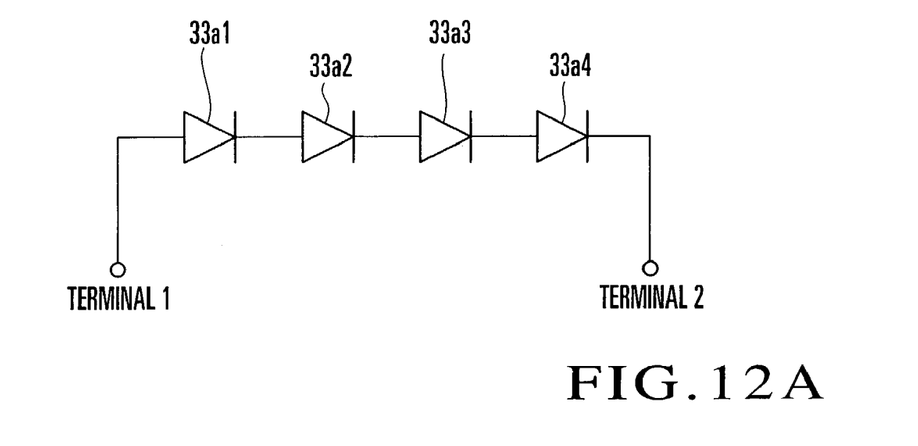
FIGS. 12A and 12B are circuit diagrams showing a circuit arrangement connected to an LED in the cellular phone according to the embodiment of the present invention.

The first circuit arrangement shown in FIG. 12A connects all the LEDs in series to suppress any variation in luminance (luminous intensity) in each LED.

Figure 12B:
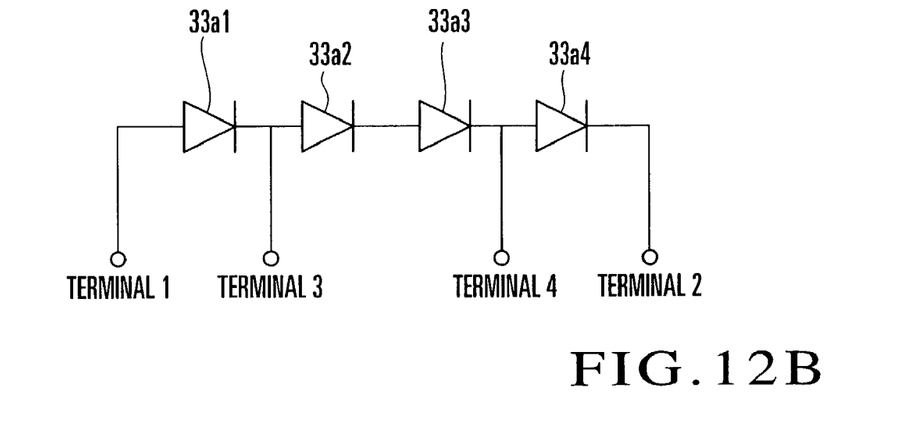

The second circuit arrangement shown in FIG. 12B can switch the input and output terminals to switch the LED to which power is supplied to cause light emission.

In the control by the above-described control section 41, when the open/close detection signal representing that the operation-side terminal main body 12 or 22 covers the main display section 14 or 24 is received, the power supply amount to the LED portion 33a is decreased as compared to a case wherein the open/close detection signal representing the covered state is not received (the covered state is not set).

As described above, the sub LCD 32 allows the user to suitably see display information on it with a smaller light amount than the main LCD 31. Hence, if the power supply amount to the LED portion 33a is kept constant independently of whether the covered state is set or not, power is consumed more than the appropriate amount that allows the user to suitably see the display information on the sub display section, and power is unnecessarily consumed.

Power supply control by the control section 41 suppresses the unnecessary power consumption.

In the control by the above-described control section 41 for the first circuit arrangement, when the open/close detection signal representing the covered state is received, the power supply amount to all the LEDs connected in series between terminals 1 and 2 in the first circuit arrangement is decreased as compared to a case wherein the open/close detection signal representing the covered state is not received.

With this control, an appropriate and sufficient luminance in the covered state can be obtained by illumination of the backlight without complicating the circuit by switching the input and output terminals. For this reason, the continuous use time of the internal battery can be prolonged while suppressing unnecessary power consumption.

In the control by the above-described control section 41 for the second circuit arrangement, when the open/close detection signal representing the covered state is received, the power supply from terminals 1 and 2 is switched to power supply from terminals 3 and 4 in the second circuit arrangement. Only the two LEDs 33$a$2 and 33$a$3 are caused to emit light and accordingly, the power supply amount is decreased.

With the control for switching the LEDs to be turned on, when the main display section 14 or 24 is not in the covered state, the backlight 33 illuminates the entire surface of the main display section. When the main display section 14 or 24 is in the covered state, only the LEDs near the display surface of the sub display section 15 or 25 receive power and emit light. Accordingly, as compared to a case wherein the entire surface of the main display section is illuminated, the lighting range can be optimized, and the emitted light amount can be efficiently used. In addition, the continuous use time of the internal battery can be prolonged while suppressing unnecessary power consumption.

In control that combines the above-described two control procedures, when the main display section 14 or 24 is in the covered state, the power supply from terminals 1 and 2 is switched to power supply from terminals 3 and 4 in the second circuit arrangement. In addition, the power supply amount is decreased such that an appropriate and sufficient luminance can be obtained by lighting by the LED portion 33$a$ to allow the user to see the display information on the sub display section 15 or 25 in the covered state.

With this control, when the main display section 14 or 24 is in the covered state, only the LEDs near the display surface of the sub display section 15 or 25 are caused to emit light. Hence, the emitted light amount can be efficiently used, and unnecessary power consumption can be further suppressed.

With each of the above-described control procedures by the control section 41, when the main display section 14 or 24 is in the covered state, the emitted light amount can be efficiently used, and unnecessary power consumption can be suppressed even in the arrangement of the present invention, which illuminates the main display section 14 or 24 and sub display section 15 or 25 with a single backlight.

In addition, the power consumption can be efficiently controlled by the form of two terminal main bodies while simultaneously illuminating the main display section 14 or 24 and sub display section 15 or 25.

The above-described embodiments exemplify the embodiments of the present invention, and various changes and modifications can be made in, e.g., the following way without departing from the spirit and scope of the invention.

In the above-described embodiments of the present invention, the LEDs in the backlight 33 are laid out as shown in FIG. 10A. However, the present invention is not limited to this as far as the LEDs are arranged at positions outside the through hole 34$a$ in the direction of flat surface of the frame 34. For example, the LEDs may be laid out as shown in FIG. 13A or 13B.

Figure 13A:
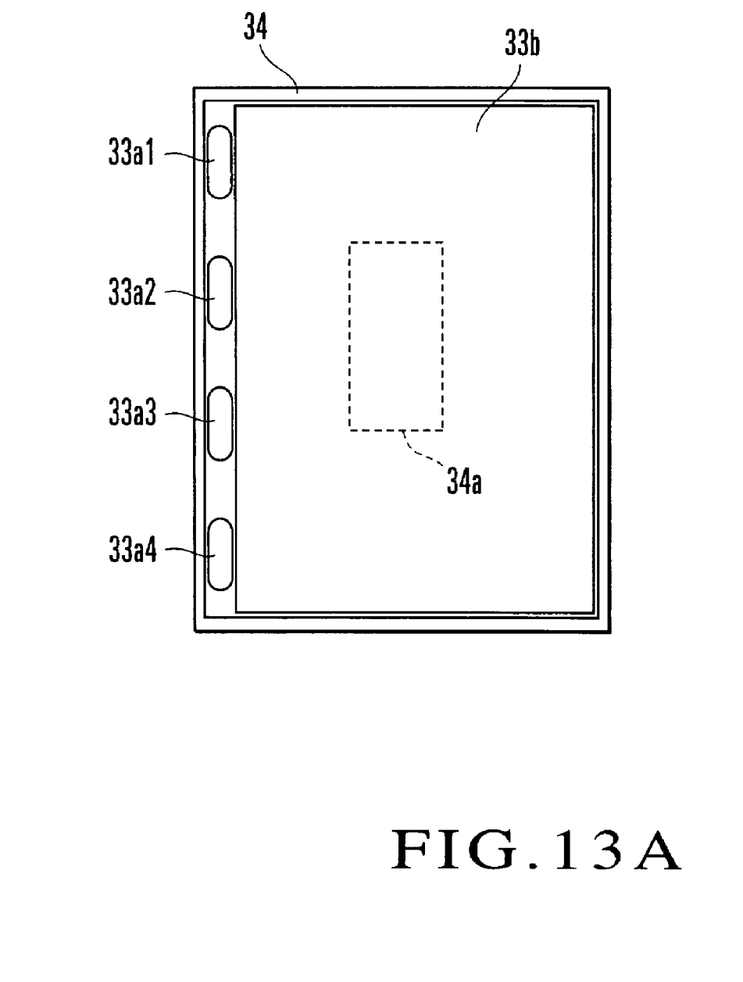
FIGS. 13A and 13B are front views showing other embodiments for the backlights and frames, which employ other layouts of LEDs in the backlights 33.

Referring to FIG. 13A, the LEDs 33$a$1 to 33$a$4 are arranged at the outer edge of a long-side portion of the flat surface portion of the frame 34.

In this case, in the control by the control section for the second circuit arrangement shown in FIG. 12B, when the main display section 14 or 24 is in the covered state, power is supplied to only the LEDs 33$a$2 and 33$a$3 near the sub display section 15 or 25.

Figure 13B:
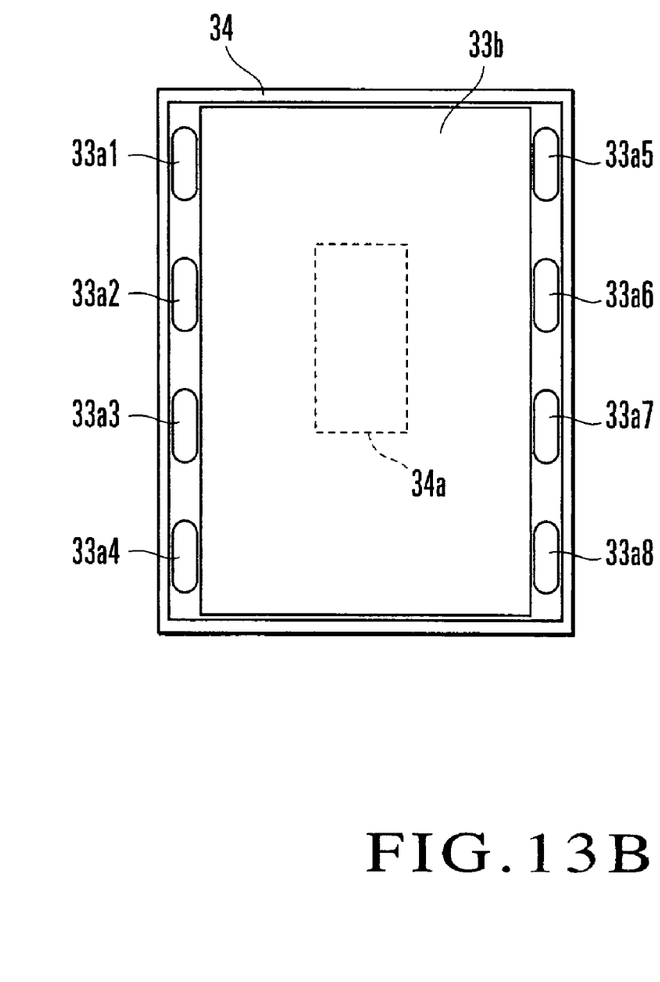

Referring to FIG. 13B, eight LEDs are arranged at the outer edges of two long-side portions of the flat surface portion of the frame 34.

In this case, in the control by the control section for the second circuit arrangement shown in FIG. 12B, when the main display section 14 or 24 is in the covered state, power is supplied to only the LEDs 33$a$2, 33$a$3, 33$a$6, and 33$a$7 near the sub display section 15 or 25.

In the above control, when the number of LEDs is more than four, power may be supplied to only about half of the LEDs in ascending order of distance from the display surface of the sub display section.

In the above-described embodiments of the present invention, the detection section that detects the form of the two terminal main bodies is constituted by a magnet and a magnetic sensing switch. However, the present invention is not limited to this as far as the detection section can electrically detect whether the main display section is in the covered state. For example, a variable resistor may be arranged on the hinge portion or slide portion to detect a state on the basis of the resistance value.

In the above-described embodiments, one sub display section is arranged. However, the number of sub display sections is not limited to one, and a plurality of sub display sections may be arranged. When a plurality of sub display sections are arranged, through holes are formed in the frame 34 at portions where the sub display sections are to be arranged. When the main display section is in the covered state, the control section supplies power to only LEDs near each sub display section.

The sub display section 15 or 25 need not always be parallel to the main display section depending on the shape of the housing as long as the sub display section is located immediately on the rear side of the main display section.

In the above description, the portable terminal apparatus according to the present invention is applied to a cellular phone. However, the present invention is not limited to this. The present invention can also be applied to a portable terminal apparatus which has display sections on a predetermined surface and its rear surface of one terminal main body without, e.g., any speech communication function.

The present invention having the above arrangement has the following advantageous effects.

According to the present invention, one illumination section which illuminates a plurality of display sections is provided. Even when the display sections are arranged on one surface and its rear surface, the increases in thickness, weight, and cost due to use of two illumination sections can be prevented. In addition, even when the plurality of display sections are simultaneously illuminated, power consumption for light emission of two illumination sections can be prevented.

When a through hole having a size necessary for causing one illumination section to illuminate the respective display sections is formed in the flat surface of the support that supports the display sections and illumination section, efficient illumination can be executed without shielding illumination to each display section by the support.

In addition, a control section is prepared to control and decrease the power supply amount to the illumination section when the detection section detects that the main display section is in the covered state as compared to a case wherein the main display section is not in the covered state. With this arrangement, when the main display section is covered, the power consumption can be suppressed as compared to the case wherein the main display section is not in the covered state. Accordingly, when the sub display section allows the user to suitably see display information on it with a smaller light amount than the main display section, the power consumption can be particularly largely reduced without damaging the visibility of the user.

When whether the main display section is in the covered state is detected on the basis of whether the distance between the magnet and the magnetic sensing switch is the sensing distance of the magnetic sensing switch, an appropriate margin can be ensured for sensing the change in distance in the above control. Accordingly, a more suitable operability without any sense of incompatibility can be ensured for the user.

When the main display section is in the covered state, the control section supplies power to only predetermined lighting portions near the display surface of the sub display section. Hence, when the main display section is in the covered state, the lighting range can be optimized. Accordingly, the emitted light amount can be efficiently used, and power consumption can be decreased.

What is claimed is:

1. A portable terminal apparatus comprising:
   transmission/reception means for transmitting/receiving a signal;
   operation means for performing input;
   first display means for displaying information;
   second display means, arranged to make a rear surface oppose that of said first display means, for displaying information different from that of said first display means;
   one illumination means for illuminating said first display means and second display means;
   a housing which can change to obtain a form in which said first display means is covered while said second display means is exposed and a form in which both said first display means and second display means are exposed, said first display means and second display means are illuminated with transmission light from said illumination means;
   detection means for detecting whether said first display means is covered; and
   illumination control means for controlling a power supply amount to said illumination means on the basis of a signal from said detection means,
   wherein said illumination means comprises
      a plurality of lighting means arranged at positions outside the through hole of said illumination means, and
      light guide means for guiding light from said plurality of lighting means to entire surfaces of said first display means and second display means, and
   wherein said illumination control means controls to supply power to only substantially half of said plurality of lighting means in ascending order of distance from the display surface of said second display means on the basis of a signal from said detection means.

2. An apparatus according to claim 1, wherein said housing comprises
   a display-side terminal main body having said first display means and second display means,
   an operation-side terminal main body having operation buttons, and
   hinge means for connecting said display-side terminal main body and operation-side terminal main body to open or close said terminal main bodies such that said terminal main bodies are folded while making said first display means oppose said operation buttons.

3. An apparatus according to claim 1, wherein said housing comprises
   a display-side terminal main body having said first display means and second display means,
   an operation-side terminal main body having operation buttons, and
   slide means arranged on one of said display-side terminal main body and operation-side terminal main body, and
   slidable support means, arranged on the other of said display-side terminal main body and operation-side terminal main body, for slidably supporting said slide means.

4. An apparatus according to claim 1, wherein said detection means comprises
   a magnet arranged on said housing, and
   a magnetic sensing switch which detects on the basis of a distance to said magnet whether a covered state is set.

5. An apparatus according to claim 1, further comprising a support which supports said first display means and illumination means from one surface and said second display means from the other surface and has a through hole through which an entire display surface of said second display means is illuminated with said illumination means, and
   wherein a size of the display surface of said second display means is smaller than that of said first display means in vertical and horizontal directions, and
   said illumination means is arranged between said first display means and said support to illuminate the entire display surface of said first display means.

6. A portable terminal apparatus, comprising:
   a housing;
   a signal transmission/reception section within said housing;
   an operation section within said housing;
   a first liquid crystal display;
   a second liquid crystal display facing a surface opposed to that of said first liquid display, said second liquid crystal display displaying information different from that of said first liquid crystal display;
   a single illumination means for illuminating said first liquid crystal display and said second liquid crystal display; and
   a support within said housing which supports said first liquid crystal display and said illumination means from a first surface and supports said second liquid crystal display from a second surface so that said second liquid crystal display is spaced apart from said illumination means, wherein said housing is changeable between a first form in which said first liquid crystal display is covered while said second liquid crystal display is exposed and a second form in which both said first crystal display and said second liquid crystal display are exposed, wherein a size of the display surface of said second liquid crystal display is smaller than that of said first liquid crystal display in vertical and horizontal directions, and wherein said illumination means is between said first liquid crystal display and said first surface of said support to illuminate the entire display surface of said first liquid crystal display.

7. The apparatus according to claim 6, further comprising a detector that detects whether said first liquid crystal display is covered.

8. The apparatus according to claim 7, further comprising an illumination controller that adjusts a power supply amount to said illumination means on the basis of a signal from said detector.

9. The apparatus according to claim 8, wherein said illumination means comprises:

a plurality of lights arranged at positions outside the through hole of said illumination means, and light guides that guide light from said plurality of lights to entire surfaces of said first liquid crystal display and said second liquid crystal display.

10. The apparatus according to claim 9, wherein said illumination controller supplies power to only a predetermined one of said plurality of lights on the basis of a signal from said detector.

* * * * *